(12) United States Patent
Wissler et al.

(10) Patent No.: US 6,209,313 B1
(45) Date of Patent: Apr. 3, 2001

(54) METHOD OF REDUCING THE $NO_x$ CONTENT IN THE EXHAUST GAS OF A DIESEL INTERNAL COMBUSTION ENGINE

(75) Inventors: Gerhard Wissler, Sünching; Günther Pajonk, Zapfendorf; Lothar Hofmann, Altenkunstadt; Manfred Weigl, Viehhausen, all of (DE)

(73) Assignee: Siemens Aktiengesellschaft, Munich (DE)

(\*) Notice: Subject to any disclaimer, the term of this patent is extended or adjusted under 35 U.S.C. 154(b) by 0 days.

(21) Appl. No.: 09/188,723

(22) Filed: Nov. 9, 1998

(30) Foreign Application Priority Data

Nov. 7, 1997 (DE) .............................................. 197 49 400

(51) Int. Cl.[7] ..................................................... F01N 3/00
(52) U.S. Cl. ................................ 60/274; 60/286; 60/303
(58) Field of Search ............................... 60/274, 286, 303, 60/301, 285, 278; 123/698, 568.11

(56) References Cited

U.S. PATENT DOCUMENTS

| | | | |
|---|---|---|---|
| 4,854,123 | * 8/1989 | Inoue | 60/274 |
| 5,410,873 | * 5/1995 | Tashiro | 60/276 |
| 5,806,310 | * 9/1998 | Daidou et al. | 60/286 |
| 5,842,341 | * 12/1998 | Kibe | 60/274 |
| 5,845,487 | * 12/1998 | Fraenkle et al. | 60/274 |
| 5,884,475 | * 3/1999 | Hofmann et al. | 60/274 |
| 5,884,476 | * 3/1999 | Hirota et al. | 60/278 |
| 5,950,422 | * 9/1999 | Dolling | 60/274 |
| 6,006,515 | * 12/1999 | Wakamoto | 60/274 |

FOREIGN PATENT DOCUMENTS

| | | |
|---|---|---|
| 42 03 807 A1 | 8/1993 | (DE) . |
| 43 15 278 A1 | 11/1994 | (DE) . |
| 43 34 071 C1 | 2/1995 | (DE) . |
| 44 36 415 A1 | 4/1996 | (DE) . |

\* cited by examiner

*Primary Examiner*—Thomas Denion
*Assistant Examiner*—Binh Tran
(74) *Attorney, Agent, or Firm*—Herbert L. Lerner; Laurence A. Greenberg; Werner H. Stemer

(57) ABSTRACT

Excessive $NO_x$ emission in a diesel internal combustion engine with SCR exhaust gas treatment is detected by a control unit. The excessive $NO_x$ emission value is determined from the catalytic-converter efficiency calculated for the metering of the reducing agent. In response, measures are taken, such as delayed start of the fuel injection, deactivation of a coasting cutoff, reducing an exhaust gas recirculation rate and/or increasing the idling speed. As a result, the $NO_x$ content in the untreated exhaust gas drops, the catalytic-converter temperature increases more quickly after a cold start, and the $NO_x$ emission is reduced.

7 Claims, 3 Drawing Sheets

METHOD OF REDUCING THE $NO_x$ CONTENT IN THE EXHAUST GAS OF A DIESEL INTERNAL COMBUSTION ENGINE

BACKGROUND OF THE INVENTION

FIELD OF THE INVENTION

The invention lies in the field of exhaust gas purification. In particular, the invention pertains to a method of reducing the $NO_x$ content in the exhaust gas of a diesel internal combustion engine. The applicable system includes a catalytic converter for the catalytic after-treatment of the exhaust gas according to the SCR principle. A reducing agent is supplied into the exhaust gas upstream of the catalytic converter. A control unit determines the control parameter of the diesel engine, in particular the start of injection of the fuel, the idling speed, and the respective catalytic-converter efficiency and calculates the desired value for the reducing agent feed in dependence on the catalytic-converter efficiency.

The selective-catalytic-reduction method, or SCR method, is suitably used to reduce the $NO_x$ content in the exhaust gas of a diesel internal combustion engine. In the process, a reducing agent is injected into the exhaust gas at a point upstream of a catalytic converter. Any $NO_x$ contained in the exhaust gas is thus reduced to $N_2$. Ammonia may be used as the reducing agent. For reasons of ease-of-handling, an aqueous solution of urea is normally used. See, for example, U.S. Pat. No. 5,665,318 (German patent application DE 44 36 415 A).

In the urea SCR system, the desired quantity of the reducing agent metering is continuously calculated by the control unit of the diesel internal combustion engine. To this end, the control unit requires the instantaneous catalytic-converter efficiency. The latter is determined from operating parameters and the catalytic-converter temperature. The catalytic-converter temperature may in turn be determined, for example, by a model computation from the exhaust gas temperature and the exhaust gas mass flow.

The effectiveness and efficiency of the exhaust gas treatment depends on the catalytic-converter temperature. FIG. 3 shows a typical characteristic of the catalytic-converter efficiency as a function of the catalytic-converter temperature. The catalytic-converter efficiency at which the $NO_x$ reduction is effected reaches a maximum within the temperature range around 250° C. and drops steeply toward lower temperatures. The catalytic-converter efficiency approaches zero at temperatures below 120° C. If aqueous urea solution is used as the reducing agent, the metering may only be effected if the exhaust gas temperature is high enough for the decomposition of urea for forming the ammonia required for the catalytic conversion. The decomposition of urea is catalytically assisted and starts at temperatures above 130° C. Lower temperatures mean, therefore, that, firstly, no reducing agent can be metered and, secondly, the catalytic converter is ineffective.

The catalytic exhaust gas treatment in a diesel internal combustion engine, specifically for the $NO_x$ reduction, is ineffective directly after a cold start of the engine. The catalytic reaction does not start until the exhaust gas temperature increases. During coasting operation, the exhaust gas cools down relatively quickly, so that, for instance during the acceleration of a vehicle after downhill sections, the catalytic $NO_x$ reduction is virtually ineffective, which results in an undesirably high $NO_x$ emission.

SUMMARY OF THE INVENTION

It is accordingly an object of the invention to provide a method of reducing the $NO_x$ content in the exhaust gas of a diesel internal combustion engine, which overcomes the above-mentioned disadvantages of the heretofore-known methods of this general type and which increases the catalytic-converter efficiency in the SCR system more quickly if the catalytic-converter temperature is too low.

With the foregoing and other objects in view there is provided, in accordance with the invention, a method of reducing the $NO_x$ content in the exhaust gas of a diesel internal combustion engine, which comprises:

treating exhaust gas of a diesel internal combustion engine in an SCR catalytic converter;

feeding reducing agent into the exhaust gas upstream of the catalytic converter in a flow direction of the exhaust gas;

determining, with a control unit, control parameters of the diesel internal combustion engine and a respective catalytic-converter efficiency;

calculating a setpoint value for a reducing agent feed in dependence on the catalytic-converter efficiency; and if the catalytic-converter efficiency drops below a predetermined value, changing the control parameters of the diesel internal combustion engine with the control unit (1) as a function of the catalytic-converter efficiency such that a $NO_x$ content in the exhaust gas upstream of the catalytic converter is reduced and the exhaust gas temperature is increased.

In accordance with an added feature of the invention, the control parameters include a start of fuel injection into the diesel internal combustion engine and an idling speed of the engine.

In accordance with an additional feature of the invention, if the catalytic-converter efficiency drops below the predetermined value, an injection instant of the fuel is delayed. In the alternative, or in addition, if the catalytic-converter efficiency drops below the predetermined value, an idling speed of the diesel internal combustion engine is increased.

In accordance with another feature of the invention, which is applicable to a diesel engine that is operated with cutoff of the fuel feed during a coasting operation, the coasting cutoff is deactivated if the catalytic-converter efficiency drops below the predetermined value.

In accordance with a further feature of the invention, which is applicable to a diesel engine equipped with exhaust gas recirculation, an exhaust gas recirculation rate is increased if the catalytic-converter efficiency drops below the predetermined value.

In accordance with again a further feature of the invention, the catalytic-converter efficiency is determined from control parameters of the diesel internal combustion engine, including the exhaust gas mass flow and a measured exhaust gas temperature.

In accordance with a concomitant feature of the invention, the exhaust gas mass flow is calculated by a model computation incorporating an engine speed and an intake pressure or a boost pressure.

In other words, the catalytic-converter efficiency is calculated from engine data, such as air mass, operating temperature or load. In selective catalytic reduction, these calculations are necessary for adjusting the reducing agent feed. With due regard to the catalytic-converter efficiency, by intervention in the control parameters, in particular the start of injection, injection characteristic, exhaust gas recirculation rate, or valve control, the $NO_x$ emission can be reduced at the expense of fuel consumption minimization. By the intervention in the control parameters, the $NO_x$ content in the untreated exhaust gas is reduced on the one hand and, on the other hand, due to the reduction in the efficiency of the diesel internal combustion engine, the exhaust gas temperature increases more quickly, which in turn increases the catalytic-converter efficiency. The lower efficiency in a cold internal combustion engine can be accepted, since measures for quick heating of the internal combustion engine are required anyway for reasons of comfort.

In the context of spark-ignition engines, it has become known from an article "Assessment of Stoichiometric GDI Engine Technology" in AVL Conference Engine and Environment, 1997, p. 106–07 to delay the injection instant at the expense of extra consumption of fuel in order to reduce the nitrogen-oxide emissions.

Other features which are considered as characteristic for the invention are set forth in the appended claims.

Although the invention is illustrated and described herein as embodied in a method of reducing the $NO_x$ content in the exhaust gas of a diesel internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
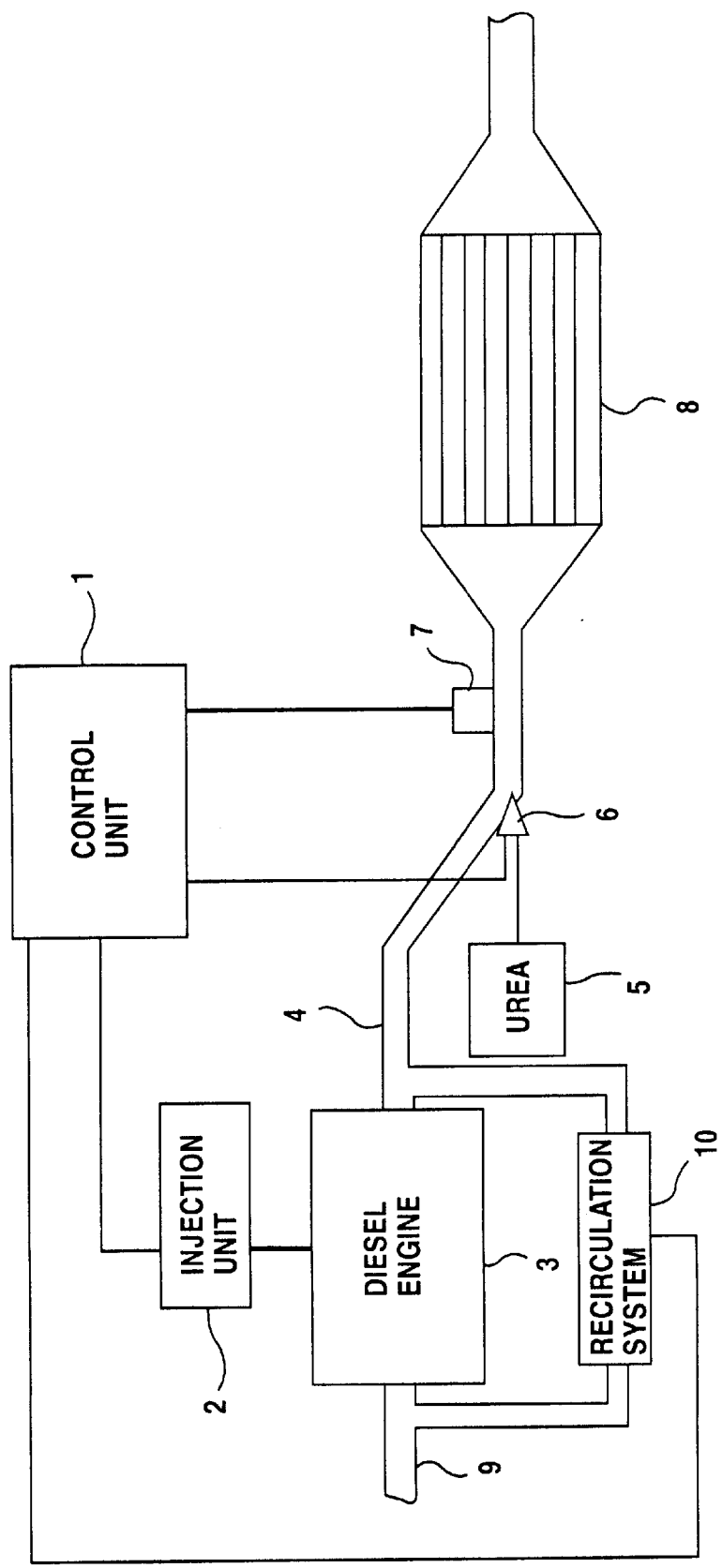
FIG. 1 is a schematic diagram of a diesel internal combustion engine with a catalytic after-treatment system of the exhaust gas according to the SCR principle.

Referring now to the figures of the drawing in detail and first, particularly, to FIG. 1 thereof, there is seen a diesel internal combustion engine 3. The diesel engine 3 has an intake tract 9, an injection unit 2, and an exhaust gas tract 4. An SCR catalytic converter 8 is arranged in the exhaust gas tract 4. A metering device, consisting of a reducing agent feed 5 and a metering valve 6, is located upstream of the catalytic converter 8. From the reducing agent feed 5, urea, as reducing agent, is injected via the metering valve 6 into the exhaust gas upstream of the catalytic converter 8 (relative to the flow of the exhaust gas). The metering valve 6 is activated by a control unit 1 via corresponding lines. A sensor 7, which measures the heat of vaporization of the injected reducing agent, is provided in order to monitor and control the metering of the reducing agent. The control unit 1 of the diesel internal combustion engine 3 controls the injection unit 2. Furthermore, the diesel internal combustion engine 3 has a system 10 for the recirculation of exhaust gas and a cutoff of the fuel feed during coasting operation. These latter details are conventional and are not illustrated for reasons of simplicity of the description.

The control unit 1 determines the catalytic-converter efficiency and the NOx content in the untreated exhaust gas of the diesel internal combustion engine 3 as follows:

The catalytic-converter efficiency is inferred from a characteristics map as a function of the exhaust gas temperature and the exhaust gas quantity upstream of the catalytic converter. To this end, the exhaust gas quantity is determined from the intake-air mass; however, it may also be determined from the rotational speed, the intake pressure, or the boost pressure and fuel mass.

A further characteristics map supplies the $NO_x$ content in the untreated exhaust gas.

Starting from these values, the control unit implements two measures if the $NO_x$ emission is too high:

By intervention in the control parameters for start of injection, exhaust gas recirculation rate, coasting cutoff, idling speed, etc., the $NO_x$ content in the untreated exhaust gas is adapted to the instantaneous catalytic-converter efficiency. In other words, excessive pollutant emission is avoided despite restricted or deficient $NO_x$ reduction. The start of injection may be delayed individually or as a combination, the exhaust gas recirculation rate may be increased, the coasting cutoff may be deactivated, or the idling speed may be increased.

By changing the control parameters, the exhaust gas temperature is increased, e.g. by delayed start of injection, in order to bring the catalytic converter to operating light-off temperature as quickly as possible after a cold start or in order to prevent excessive cooling, e.g. in coasting phases.

Figure 2:
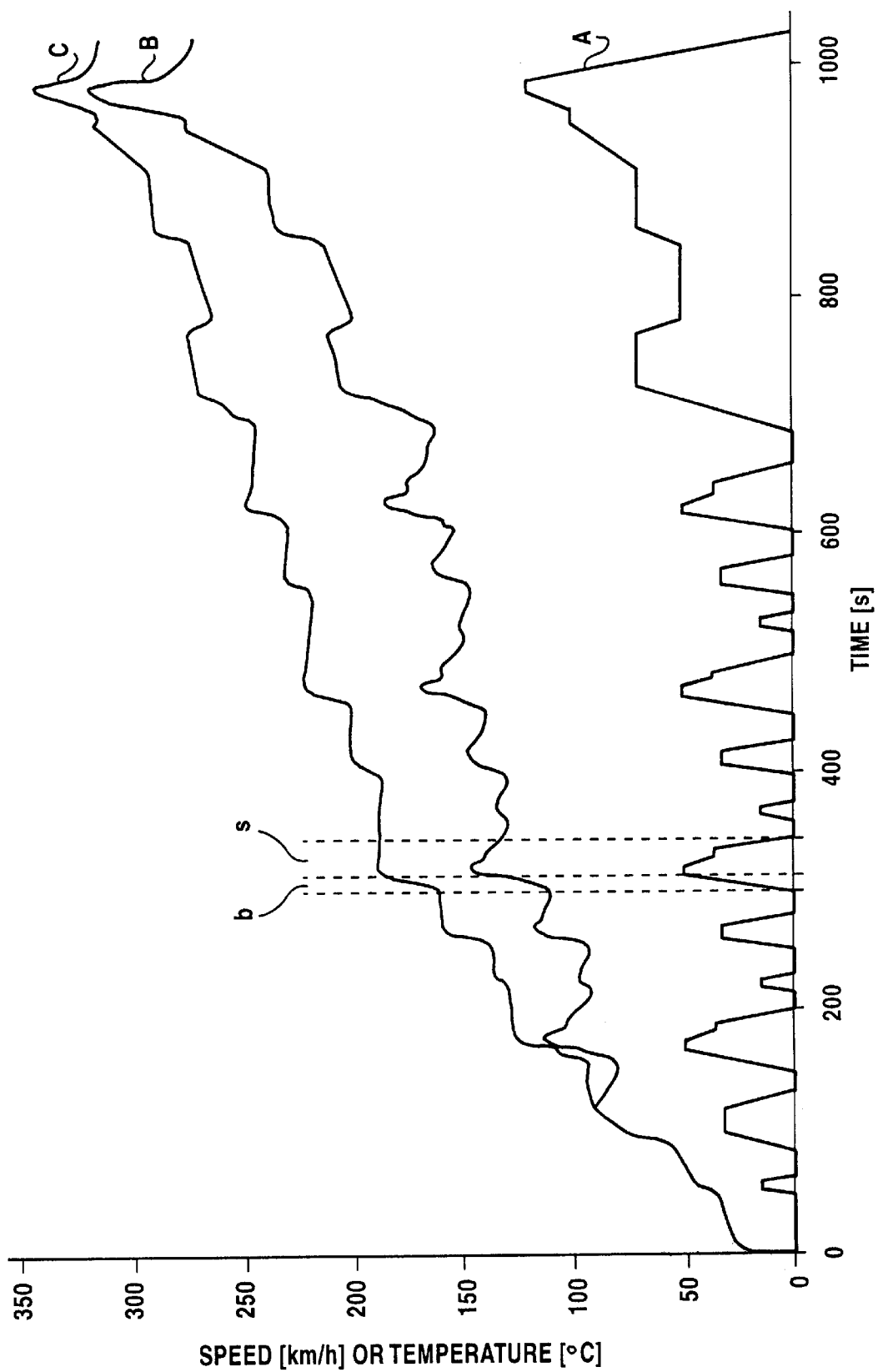
FIG. 2 is a graph illustrating the time characteristic of the catalytic-converter temperature in a test vehicle that passes through a certain speed characteristic.

Reference is now had to FIG. 2, where the effect of the above measures is illustrated. Curve A shows the time speed characteristic, predetermined by a test code (MVEG test cycle), with which a test vehicle runs after a cold start.

Curve B shows the time characteristic of the catalytic-converter temperature in the case of an exhaust gas after-treatment according to the prior art. Curve C shows the time characteristic of the catalytic-converter temperature with reference to the method according to the invention for reducing the $NO_x$ content.

The speed characteristic of the MVEG test cycle is as follows: first of all the test vehicle passes through a speed profile which is typical of inner city traffic, with repeated acceleration, braking and stopping. An exemplary acceleration phase is designated by b and a coasting phase by s. After 700 seconds, the test vehicle is run at higher speeds.

Figure 3:
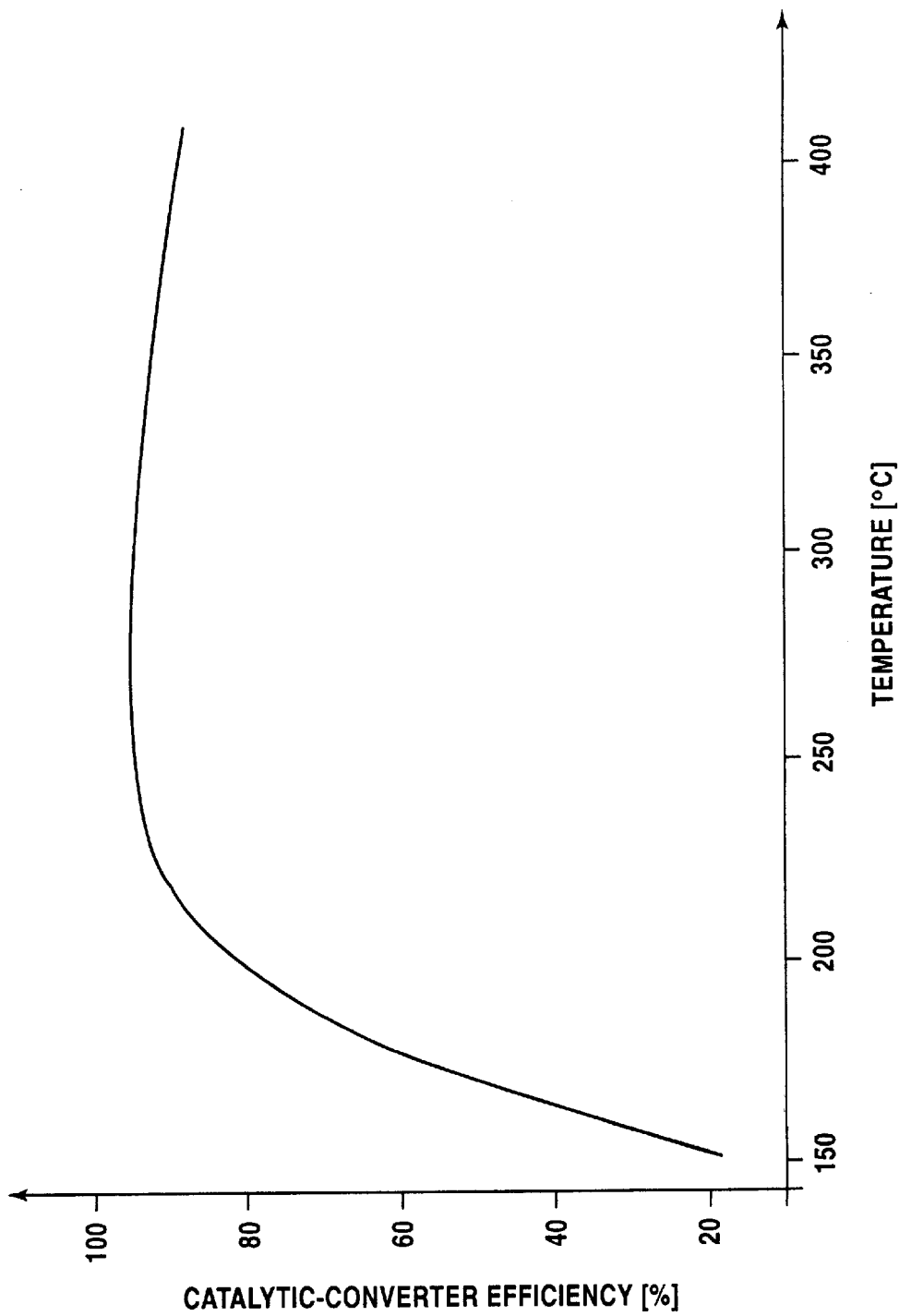
FIG. 3 is a graph of the catalytic-converter efficiency as a function of the catalytic-converter temperature.

Curve B shows the characteristic of the catalytic-converter temperature, which, as known from FIG. 3, is associated with the catalytic-converter efficiency, in the case of a catalytic converter according to the SCR principle. It can clearly be seen that the temperature drops during phases of braking or during stopping of the test vehicle. That is to say, the efficiency of the catalytic after-treatment likewise falls, which is accompanied by an increasing $NO_x$ content in the treated exhaust gas. The temperature at which the addition of reducing agent according to the SCR principle can be started is not exceeded with lasting effect until after 300 seconds.

Curve C shows the characteristic of the catalytic converter temperature after a cold start with reference to the method according to the invention. The following interventions in the control parameters were carried out:

In the acceleration phases b, the start of injection was delayed as compared with the conventionally optimized tuning in terms of consumption, a factor which accelerates the heating of the catalytic converter on account of the hotter exhaust gases. This results in a steeper slope of the curve C compared with the curve B. In addition, lower $NO_x$ content in the untreated exhaust gas results due to the later start of injection.

In the coasting phases s, the coasting cutoff is deactivated, as a result of which the cooling phases recognizable in curve A are avoided and a higher temperature level is achieved much more quickly.

Even after less than 180 seconds, the temperature (at 120° C.) at which the addition of reducing agent according to the SCR principle can be started is exceeded.

In principle, the measures taken result in extra consumption of fuel. However, since they are only taken at an inadequate catalytic converter temperature, which is only necessary in operating phases with low engine load and after a cold start, this extra consumption is very low in practical driving operation. Since quicker heating up of the internal combustion engine is desired anyway for reasons of comfort, the insignificantly increased fuel consumption can be accepted.

We claim:

1. A method of reducing a $NO_x$ content in the exhaust gas of a diesel internal combustion engine, which comprises:

treating exhaust gas of a diesel internal combustion engine in an SCR catalytic converter, the exhaust gas having an exhaust gas mass flow;

feeding reducing agent into the exhaust gas upstream of the catalytic converter in a flow direction of the exhaust gas;

determining, with a control unit, control parameters of the diesel internal combustion engine and a respective catalytic-converter efficiency, the respective catalytic converter efficiency determined from control parameters of the diesel internal combustion engine including the exhaust gas mass flow and a measured exhaust gas temperature;

calculating a setpoint value for a reducing agent feed in dependence on the catalytic-converter efficiency; and if the catalytic-converter efficiency drops below a predetermined value, changing the control parameters of the diesel internal combustion engine with the control unit as a function of the catalytic-converter efficiency such that $NO_x$ in the exhaust gas upstream of the catalytic converter is reduced and the exhaust gas temperature is increased.

2. The method according to claim 1, wherein the control parameters include a start of fuel injection into the diesel internal combustion engine and an idling speed of the diesel internal combustion engine.

3. The method according to claim 1, which comprises, if the catalytic-converter efficiency drops below the predetermined value, delaying an injection instant of the fuel.

4. The method according to claim 1, which comprises, if the catalytic-converter efficiency drops below the predetermined value, increasing an idling speed of the diesel internal combustion engine.

5. The method according to claim 1, wherein the diesel internal combustion engine is operated with cutoff of the fuel feed during a coasting operation, and wherein the method further comprises deactivating the coasting cutoff if the catalytic-converter efficiency drops below the predetermined value.

6. The method according to claim 1, wherein the diesel internal combustion engine is equipped with exhaust gas recirculation, and wherein the method further comprises increasing an exhaust gas recirculation rate if the catalytic-converter efficiency drops below the predetermined value.

7. The method according to claim 1, which comprises determining the exhaust gas mass flow by a model computation incorporating an engine speed and one of an intake pressure and a boost pressure.

* * * * *